US012807511B2

(12) United States Patent
Iwai et al.

(10) Patent No.: US 12,807,511 B2
(45) Date of Patent: Nov. 24, 2026

(54) METHOD FOR PRODUCING LITHIUM-NICKEL COMPLEX OXIDE

(71) Applicant: Panasonic Intellectual Property Management Co., Ltd., Osaka (JP)

(72) Inventors: Mitsuru Iwai, Osaka Fu (JP); Takuya Jin, Osaka Fu (JP); Daisuke Katou, Kyoto Fu (JP); Tomoo Takayama, Osaka Fu (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 1114 days.

(21) Appl. No.: 17/763,288

(22) PCT Filed: Jul. 21, 2020

(86) PCT No.: PCT/JP2020/028285
§ 371 (c)(1),
(2) Date: Mar. 24, 2022

(87) PCT Pub. No.: WO2021/059709
PCT Pub. Date: Apr. 1, 2021

(65) Prior Publication Data

US 2023/0339774 A1 Oct. 26, 2023

(30) Foreign Application Priority Data

Sep. 27, 2019 (JP) ................................ 2019-176456

(51) Int. Cl.
*C01G 53/42* (2025.01)

(52) U.S. Cl.
CPC .................................. *C01G 53/42* (2013.01)

(58) Field of Classification Search
CPC ..................................................... C01G 53/42
See application file for complete search history.

(56) References Cited

U.S. PATENT DOCUMENTS

| | | | |
|---|---|---|---|
| 5,567,539 | A | 10/1996 | Takahashi et al. |
| 6,077,496 | A | 6/2000 | Ito et al. |
| 12,176,531 | B2 | 12/2024 | Arimura et al. |
| 12,334,538 | B2 | 6/2025 | Sakitani et al. |
| 2002/0042984 | A1 | 4/2002 | Kumazawa et al. |

(Continued)

FOREIGN PATENT DOCUMENTS

| | | | |
|---|---|---|---|
| CN | 101679074 | A | 3/2010 |
| CN | 105765770 | A | 7/2016 |

(Continued)

OTHER PUBLICATIONS

Weitz, David A. "Packing in the spheres." Science 303.5660 (2004): 968-969 (Year: 2004).*

(Continued)

*Primary Examiner* — Anthony J Zimmer
*Assistant Examiner* — Eric Scott Sherman
(74) *Attorney, Agent, or Firm* — WHDA, LLP

(57) ABSTRACT

A method for producing a lithium-nickel composite oxide includes a step of sintering molded bodies of a mixture including a lithium-containing compound and a nickel-containing compound, in a container, to obtain sintered bodies. The ratio of space occupied by gaps between the molded bodies is 0.375 or greater.

5 Claims, 3 Drawing Sheets

(56) References Cited

U.S. PATENT DOCUMENTS

| | | | |
|---|---|---|---|
| 2004/0185341 A1 | 9/2004 | Yamamoto et al. | |
| 2005/0008940 A1 | 1/2005 | Adachi et al. | |
| 2009/0194734 A1 | 8/2009 | Arimoto | |
| 2013/0209888 A1 | 8/2013 | Nagai | |
| 2015/0380726 A1 | 12/2015 | Nakanishi et al. | |
| 2016/0030923 A1 | 2/2016 | Lawing et al. | |
| 2016/0293952 A1 | 10/2016 | Kaneda et al. | |
| 2017/0309911 A1 | 10/2017 | Ryoshi et al. | |
| 2020/0251733 A1* | 8/2020 | Takano | H01M 4/505 |
| 2020/0256620 A1 | 8/2020 | Park et al. | |
| 2020/0358093 A1 | 11/2020 | Oshita et al. | |
| 2022/0059835 A1 | 2/2022 | Katou et al. | |
| 2022/0109139 A1 | 4/2022 | Suzuki | |
| 2022/0344707 A1 | 10/2022 | Yoshioka et al. | |

FOREIGN PATENT DOCUMENTS

| | | | | | |
|---|---|---|---|---|---|
| CN | 107001071 | A | | 8/2017 | |
| CN | 107406274 | A | | 11/2017 | |
| JP | H05-62678 | A | | 3/1993 | |
| JP | H11-135118 | A | | 5/1999 | |
| JP | H11-307094 | A | | 11/1999 | |
| JP | 2000-123829 | A | | 4/2000 | |
| JP | 2000-203950 | A | | 7/2000 | |
| JP | 2002-145672 | A | | 5/2002 | |
| JP | 2002-265281 | A | | 9/2002 | |
| JP | 2003-306386 | A | | 10/2003 | |
| JP | 2005-249235 | A | | 9/2005 | |
| JP | 2005-257171 | A | | 9/2005 | |
| JP | 2008-103100 | A | | 5/2008 | |
| JP | 2010-241626 | A | | 10/2010 | |
| JP | 2011-146309 | A | | 7/2011 | |
| JP | 2014-63708 | A | | 4/2014 | |
| JP | 2017-117700 | A | | 6/2017 | |
| JP | 2018041657 | A | * | 3/2018 | Y02E 60/10 |
| JP | 2018-104276 | A | | 7/2018 | |
| JP | 2019-99406 | A | | 6/2019 | |
| KR | 20190076767 | | * | 7/2019 | C01G 53/44 |
| WO | 2012/133525 | A1 | | 10/2012 | |
| WO | 2018/021453 | A1 | | 2/2018 | |
| WO | WO 201802145 | | * | 2/2018 | C01G 53/00 |
| WO | 2019/066545 | A1 | | 4/2019 | |
| WO | 2019/087494 | A1 | | 5/2019 | |
| WO | 2019/131779 | A1 | | 7/2019 | |

OTHER PUBLICATIONS

Office Action dated Sep. 12, 2023, issued in counterpart CN application No. 202080066224.6, with partial English translation. (9 pages).

International Search Report dated Sep. 24, 2020, issued in counterpart International Application No. PCT/JP2020/028285 (3 pages).

Extended European Search Report dated Oct. 21, 2022, issued in EP Application No. 20869960.3. (8 pages).

Randon close pack, Published online by Wikipedia, the free encyclopedia, https://en.wikipedia.org/w/index.php?title=Random_close_pack&oldid=528454367, show a publication dated of Dec. 17, 2012. (3 pages).

Final Office Action dated Oct. 27, 2025, issued in U.S. Appl. No. 17/794,763.(15 pages).

* cited by examiner

METHOD FOR PRODUCING LITHIUM-NICKEL COMPLEX OXIDE

TECHNICAL FIELD

The present disclosure relates to a method for producing a lithium-nickel composite oxide.

BACKGROUND ART

A secondary battery represented by a lithium ion secondary battery includes a positive electrode, a negative electrode, and an electrolyte. The positive electrode includes a lithium-containing composite oxide serving as a positive electrode active material. As the lithium-containing composite oxide, for example, lithium nickelate is used which is advantageous in achieving a higher capacity, and with an aim of further improving the battery performance, studies have been made to replace part of the nickel with a different kind of metal.

Patent Literature 1, relating to a method for producing a lithium-nickel composite oxide, discloses a method including: supplying a plurality of molded bodies continuously or intermittently into a vertical furnace from its upper part, the molded bodies obtained by molding a mixture including powders of a nickel-containing compound and a lithium-containing compound; sintering the molded bodies in the vertical furnace; and ejecting the molded bodies having been subjected to sintering, continuously or intermittently out of the vertical furnace form its lower part.

CITATION LIST

Patent Literature

[PTL 1] Japanese Laid-Open Patent Publication No. 2019-99406

SUMMARY OF INVENTION

Technical Problem

In the production method disclosed in Patent Literature 1, in supplying a large amount of molded bodies into the furnace, gas does not easily circulate inside the furnace, and heat is not easily transmitted to the molded bodies, which in some cases results in a low crystallinity of the resultant sintered bodies.

One aspect of the present disclosure relates to a method for producing a lithium-nickel composite oxide, including: a step of sintering molded bodies of a mixture including a lithium-containing compound and a nickel-containing compound, in a container, to obtain sintered bodies, wherein a ratio of space occupied by gaps between the molded bodies is 0.375 or greater.

Another aspect of the present disclosure relates to a method for-producing a lithium-nickel composite oxide, including: a step of sintering molded bodies of a mixture including a lithium-containing compound and a nickel-containing compound, in a container, to obtain sintered bodies, wherein the molded bodies have a Maximum length L of 11 Min or more, the molded bodies have a minimum length h of 10 mm or more, and au aspect ratio: h/L of the minimum length h of the molded bodies to the maximum length L of the molded bodies is 0.4 or greater.

According to the present disclosure, a lithium-nickel composite oxide with high crystallinity can be efficiently obtained.

DESCRIPTION OF EMBODIMENTS

Figures 1A, 1B, 1C, 1D:
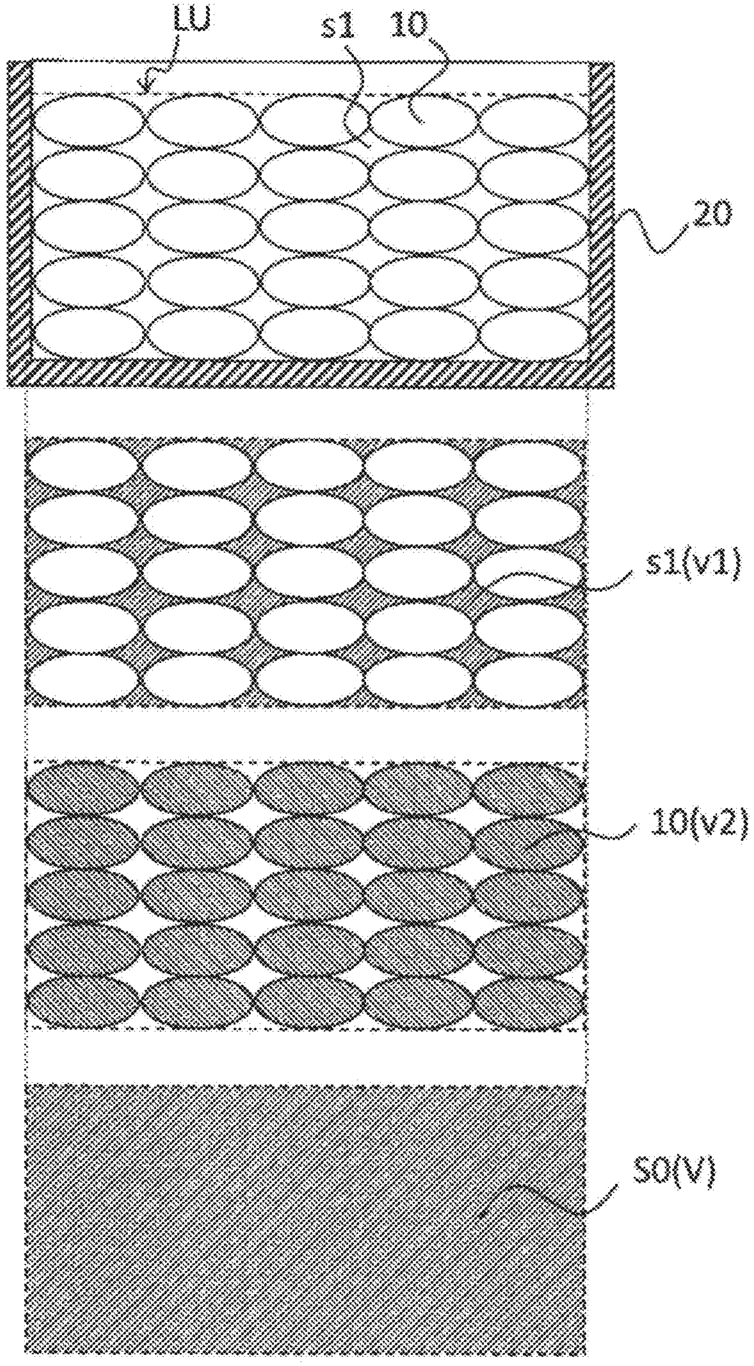
FIGS. 1(*a*)-1(*d*) A schematic illustration of molded bodies in a container before sintering.

A method for producing a lithium-nickel composite oxide according to an embodiment of the present disclosure includes a step of sintering molded bodies of a mixture including a lithium-containing compound and a nickel-containing compound, in a container, to obtain sintered bodies (i.e., lithium-nickel composite oxide). Here, the ratio of space occupied by gaps between the molded bodies in the container (hereinafter, simply referred to as a "space ratio") is set to 0.375 or greater (Condition 1). Alternatively, molded bodies having a maximum length L of 11 mm or more and a minimum length h of 10 mm or more, and having an aspect ratio: h/L of the minimum length h to the maximum length L of 0.4 or greater are used (Condition 2).

When at least one of Condition 1 and Condition 2 is satisfied, the circulation of gas through the gaps between the molded bodies is facilitated. This facilitates the heat conduction to the molded bodies, and allows the sintering of the molded bodies to easily proceed. Furthermore, since the circulation of gas through the gaps between the molded bodies is facilitated, unnecessary gas (mainly moisture) to be generated as the sintering proceeds can be easily discharged outside, which can suppress the influence of moisture on the molded bodies. As a result of these, the crystallinity of the sintered body is improved.

By using the form of molded bodies, it is possible to increase the contact points between the particles in each molded body and improve the thermal conductivity of the molded bodies, which is advantageous for the proceeding of sintering. However, when moisture generated from the molded body during sintering is hard to be discharged outside, the moisture remains in the molded body, causing part of the molded body to collapse, to form a sparse portion. This results in insufficient contact between the particles, and thus in decreased thermal conductivity of the molded body. Moreover, due to the presence of sparse portions and dense portions, the degree of sintering tends to vary. In order to avoid such inconveniences and improve the crystallinity of the lithium-nickel composite oxide, it is important to facilitate the circulation of gas through the gaps between the molded bodies.

According to the manufacturing method of the present embodiment, the crystallite size of the lithium-nickel composite oxide can be increased to, for example, 140 mil or more, and can be further increased to 160 nm or more, or 170 nm or more. To determine the crystallite size of the lithium-nickel composite oxide, first, an X-ray diffractometry (XRD) is performed on the lithium-nickel composite oxide, to obtain an X-ray diffraction pattern. The Obtained X-ray diffraction pattern is analyzed by the WWPPF (whole-powder-pattern fitting) method, using all diffraction peaks present between 2θ=10° to 120°. The crystallite size is calculated on the basis of the result.

In Condition 1, it suffices when the space ratio is 0.375 or greater, but in order to further increase the crystallite size of the lithium-nickel composite oxide, it is desirably 0.400 or greater, and may be 0.420 or greater, or 0.140 or greater. On the other hand, by setting the space ratio to 0.600 or less, a sufficient amount of the molded bodies can be housed in the container. The sintering efficiency can be improved, and the lithium-nickel composite oxide can be efficiently produced.

In Condition 2, the larger the maximum length L is, or the larger the aspect ratio is, the larger the space ratio tends to be. That is, in order to improve the space ratio, and facilitate the circulation of gas through the gaps between the molded bodies, it is important to control the parameters, such as the maximum length L of the molded bodies and the aspect ratio.

The maximum length L of the molded bodies may be, for example, 25 mm or more, and may be 2$ min or more. By using such large molded bodies, the circulation of gas through the gaps between the molded bodies can be further facilitated. On the other hand, in view of allowing the sintering to proceed smoothly up to the center of the molded body, the maximum length L of the molded bodies may be set to, for example, 60 min or less, and may be set to 40 mm or less.

Here, the space ratio refers to, regardless of the depth of the container, a ratio of a volume v1 of the space occupied by the gaps between the molded bodies to a volume V of the "apparent space" occupied b the molded bodies. The volume V of the apparent space is the sum of an actual volume v2 of the molded bodies and the volume v1 of the gaps. The space ratio Rs is expressed by the following formula. Here, d represents a bulk density obtained by dividing the total mass of the molded bodies packed in the container by the volume V of the apparent space, and D represents a true density of the molded bodies.

$$Rs=1-V2/V=1-d/D$$

Referring to FIG. 1(*a*), the apparent space occupied by the molded bodies is a space from the bottom inner surface of a container 20 to a packed level LU of molded bodies 10. The areas hatched with oblique lines in FIG. 1(*b*) show a spaces 1 occupied by the gaps between the molded bodies 10, and its volume is denoted by v1. The areas hatched with oblique lines in FIG. 1(*c*) show a space actually occupied by the molded bodies 10, and its volume is denoted by v2. The area hatched with oblique lines in FIG. 1(*d*) shows an apparent space S0, and its volume is denoted by (=v1+v2).

Figure 2:
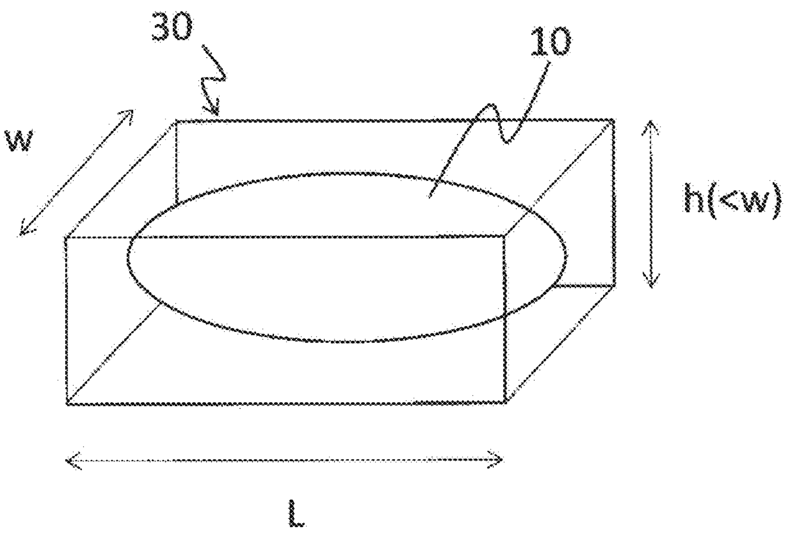
FIG. 2 A diagram showing how to determine an aspect ratio.

The maximum length L and the minimum length h of the molded bodies 10 can be determined from the smallest rectangular parallelepiped that circumscribes the molded body. Of all sides of the six squares constituting the smallest rectangular parallelepiped, the length of the longest side of all sides is the maximum length L. The length of the shortest side of all sides is the minimum length h. As illustrated in FIG. 2, once a minimum rectangular parallelepiped 30 that circumscribes the molded body 10 is defined, the maximum length L, the width w, and the minimum length (height) h are determined, and the aspect ratio: h/L can be calculated.

The maximum length E. and the minimum length h of the molded bodies may be, for example, an average of 10 values of the maximum length L and an average of 10 values of the minimum length h, respectively, determined fore any 10 molded bodies. The aspect ratio also may be an average of 10 values of the aspect ratio determined for any 10 molded bodies.

When the molded bodies are sintered at, for example, 600° C. or higher and 850° C. or lower, sintered bodies (lithium-nickel composite oxide) can be obtained. The suite-Ling time may be, for example, 2 hours or more and 30 hours or less. The sintering is usually performed in an oxidizing atmosphere containing oxygen or the like. The oxidizing atmosphere may be air or an atmosphere having an oxygen partial pressure higher than that of air. The oxygen concentration in the oxidizing atmosphere is, for example, 20% or more.

The sintering is performed, with a plurality of molded bodies are packed in a predetermined container, while an oxidizing gas is supplied into the container. Even though a large amount of molded bodies are packed in the container, when there are sufficient gaps between the molded bodies, the oxidizing gas can circulate around all of the molded bodies. Thus, homogeneous sintered bodies can be produced in a large amount.

When the mixture (powder) is sintered without subjected to compression molding, the powder may be scattered by the oxidizing gas supplied into the container, or the molten material may accumulate at the bottom of the container during sintering, which makes it difficult to allow the sintering to proceed uniformly. On the other hand, in the case of a molded body, the above inconveniences can be avoided, and the shape of the molded body is maintained even after sintering, and thus, a sintered body having almost the same shape as the molded body can be obtained.

The material of the container is preferably ceramics, a metal such as stainless steel, and the like, in consideration of the durability against high temperatures. The container usually has a shape which is open at the top, and has a bottom surface and side surfaces rising from the periphery of the bottom surface.

When sintering molded bodies in a Container, the smaller the depth of the container is, the more the circulation of gas in the vicinity: of the bottom of the container is facilitated. For facilitating the heat conduction to the molded bodies, and for discharging unnecessary gas outside, the depth of the container may be, for example, 300 min or less, and may be 200 min or less. The depth of the container refers to the height of a space capable of housing the molded bodies, inside the container. In view of efficiently sintering the molded bodies, the container is desirably large enough to house a certain amount of the molded bodies. Therefore, the depth of the container may be, for example, 20 mm or more, and may be 100 rum or more. By setting the depth of the container as above, even when the height from the bottom of the container to the packed level of the molded bodies is set to, for example, 90% or more of the depth of the container, the sintering of the molded bodies is allowed to proceed sufficiently.

In view of the ease of handling of the molded bodies in the sintering process of the molded bodies, the container may have a Shape of for example, 100 mm or more and 500 mm or less long, and 100 mm or more and 500 mm or less wide. Such a container has an internal space of a substantially rectangular parallelepiped shape, and therefore, can be efficiently placed in a sintering furnace.

The sintering furnace may be of a vertical type or a horizontal type, but may be, for example, a tunnel-type horizontal sintering furnace.

The molded body can be obtained by, for example, compression molding a mixture including a lithium-containing compound and a nickel-containing compound. The molded body may have any shape, but for being heated efficiently and uniformly, it may be shaped in for example, a spherical, elliptical spherical (long spherical), columnar, elliptical columnar, prismatic, disk-like, or almond-like shape. The compression molding can be performed using, for example, a briquette molding machine, a pellet molding machine, a granulator, a tableting machine or the like.

The compression molding is preferably performed by dry process. In the compression molding by dry process, the mixture is compression-molded without adding a dispersion medium, such as water.

The density of the molded body is, for example, 1.5 $g/cm^3$ or more and 2.2 $g/cm^3$ or less. When the density of the molded body is 1.5 $g/cm^3$ or more, the particles constituting the molded body can be sufficiently brought into contact (close contact) with each other, and the reaction between the particles tends to easily proceed. When the density of the molded body is 2.2 $g/cm^3$ or less, voids are appropriately formed within the molded body, and an oxidizing gas, such as oxygen, can easily enter into the molded body and thus, the variations in the degree of sintering of the molded body tends to be reduced.

The mixture including a lithium-containing compound and a nickel-containing compound used for producing molded bodies can be obtained by mixing a lithium-containing compound and a nickel-containing compound by dry process. That is, in mixing the lithium-containing compound and the nickel-containing compound, it is preferable to mix them without adding a dispersion medium, such as water.

For the lithium-containing compound, lithium hydroxide, lithium oxide, lithium carbonate or the like can be used. In particular, lithium hydroxide has high reactivity with a nickel-containing compound, and is advantageous in improving the crystallinity of the lithium-nickel composite oxide.

Lithium hydroxide is usually in the form of powder, and has an average particle diameter (D50: particle diameter at a cumulative volume of 50% measured with a laser diffraction particle size distribution analyzer) of, for example, 10 μm or more and 500 μm or less.

When lithium hydroxide is used, the lithium hydroxide is preferably heated and dried in advance. In the case of using lithium hydroxide having been heated and dried, water is unlikely to be discharged while the molded bodies are sintered, and a lithium-nickel composite oxide having high crystallinity can be easily obtained.

The heating temperature of the lithium hydroxide is preferably equal to or higher than 100° C. and equal to or lower than its melting point. At 100° C. or higher, the moisture contained in the lithium hydroxide can be efficiently removed. When the heating temperature is equal to or lower than the melting point, the particle shape of the lithium hydroxide is maintained, and the workability is improved, and thus, a homogeneous mixture of the lithium-containing compound and the nickel-containing compound can be easily obtained. The heating time of the lithium hydroxide is, for example, 1 hour or more and 10 hours or less. Heating of lithium hydroxide may be performed in air, but is preferably performed in a non-oxidizing atmosphere containing nitrogen, argon, or the like.

Examples of the nickel-containing compound include nickel hydroxide, nickel oxide, nickel sulfate, nickel nitrate, nickel carbonate, and nickel oxalate. The nickel-containing compound may include a metal M1 other than lithium and nickel. For example, it may be a composite hydroxide containing nickel and the metal M1 (hereinafter sometimes referred to as a hydroxide A), or a composite oxide containing nickel and the metal M1 (hereinafter sometimes referred to as a composite oxide B).

The composite oxide B can be obtained by, for example, heating the hydroxide A to 300° C. or higher and 800° C. or lower. When the composite oxide B obtained by applying heat treatment to the hydroxide A is used as a mater al of the molded body, water is unlikely to be produced from the molded bodies during sintering. This can suppress the reduction in the degree of contact between the lithium-containing compound and the composite oxide B and the reduction in the thermal conductivity of the molded body. As a result, the crystallinity of the sintered body (lithium-nickel composite oxide) tends to improve. In particular, it is preferable to use a mixture of lithium hydroxide and the composite oxide B for the production of molded bodies.

The composite oxide B include S a material in which the Ni sites in the crystal lattice of the nickel oxide are partially substituted by the metal M1, or in which the metal M1 is solid-dissolved in the nickel oxide. When the heating temperature of the hydroxide A is within the above range, the composite oxide B can be efficiently obtained. The heating time of the hydroxide A is, for example, 30 minutes or more and 10 hours or less. Heating of the hydroxide A may be performed in a non-oxidizing atmosphere containing nitrogen or the like, and may be performed in an oxidizing atmosphere containing oxygen or the like. The oxidizing atmosphere may be air or an atmosphere having a higher oxygen partial pressure than air. The oxygen concentration in the oxidizing atmosphere is, for example, 20% or more.

The hydroxide A (composite hydroxide) can be produced using a known technique, such as coprecipitation. When using coprecipitation, an alkali is added to an aqueous solution containing a nickel salt and a salt of the metal M1 to coprecipitate a composite hydroxide. The nickel salt may be nickel sulfate and the like. When the metal M1 includes cobalt and aluminum, the salt of the metal M1 may be cobalt sulfate, aluminum sulfate, and the like. The alkali may be sodium hydroxide and the like.

Nickel is advantageous for achieving a higher capacity and cost reduction. The metal M1 preferably includes cobalt, and preferably includes a metal M2 other than cobalt. Cobalt is advantageous, for example, for extending the battery life. The metal M2 preferably includes at least aluminum. Aluminum is advantageous, for example, for improving the thermal stability. Using a lithium-containing composite oxide containing nickel cobalt and aluminum as the positive electrode active material is effective for achieving a higher capacity and a longer life of a secondary battery.

In view of the stabilization of the crystal structure, the metal M2 may further include at least one selected from the group consisting of manganese, tungsten, niobium, magnesium, zirconium, and zinc.

The hydroxide A preferably includes a composite hydroxide containing nickel, cobalt, and the metal M2. When such a composite hydroxide is used, nickel, cobalt, and the metal M2 can be easily dispersed uniformly in the molded body.

Given that the atomic ratio of nickel, cobalt and the metal M2 contained in the hydroxide A is Ni:Co:M2=(1-x-y):x:y, x preferably satisfies $0 \le x < 0.15$, further $0.01 < x < 0.15$, and y satisfies $0.001 < y < 0.1$. In this case, the effect of using nickel, cobalt, the metal M2 (or nickel and the metal M2) can be obtained in a balanced manner. The composite hydroxide obtained by coprecipitation can form secondary particles each comprising aggregated primary particles. The secondary particles of the composite hydroxide have an average particle diameter (D50: particle diameter at a cumulative volume of 50% measured with a laser diffraction particle size distribution analyzer) of, for example, 2 μm or more and 20 μm or less.

When molded bodies of a mixture containing lithium hydroxide and the composite oxide B are sintered at 600° C. or higher and $50° C. or lower, to give a lithium-nickel composite oxide, a layered rock-salt type lithium-nickel composite oxide in which nickel in a lithium nickel oxide is partially substituted by the metal M1 can be obtained. By partially substituting nickel by the metal M1, the battery performance can be further improved.

The lithium-nickel composite oxide preferably has a composition represented by a formula: $Li_ZNi_{1-x-y}Co_xM2_yO_2$. In the formula, a satisfies $0.9<a<1.1$, x satisfies $0\leq x\leq 0.15$, and further satisfies $0.01<x<0.15$, and y satisfies $0.001<y<0.1$. By using the lithium-nickel composite oxide having the above composition as the positive electrode active material, a secondary battery with high capacity and long life can be obtained.

When the lithium-nickel composite oxide having the above composition is produced, $Ni_{1-x-y}Co_xM2_y(OH)_2$, may be used as the hydroxide A. The lithium hydroxide and the composite oxide B are mixed such that, in the mixture used for the production of molded bodies, the atomic ratio: Li/Ni+M1) of lithium to the total of nickel and the metal M1 in the composite oxide B exceeds 0.9 but is less than 1.1.

The obtained sintered bodies may be crushed into powder. The powder may be classified so as to have a desired particle size distribution. For crushing the sintered bodies, a ball milt a mortar, or the like is used. For classification; a sieve or the like is used.

The lithium-nickel composite oxide can form secondary particles each comprising aggregated primary particles. The secondary particles of the lithium-nickel composite oxide have an average particle diameter (D50: particle diameter at a cumulative volume of 50% measured with a laser diffraction particle size distribution analyzer) of, for example, 2 μm or more and 20 μm or less.

The lithium-nickel composite oxide obtained by the above production method can be suitably used as the positive electrode active material of a secondary battery. The secondary battery includes: a positive electrode including a positive electrode active material capable of electrochemically absorbing and releasing, lithium ions; a negative electrode including a negative electrode active material capable of electrochemically absorbing and releasing lithium ions; and an electrolyte.

The positive electrode include, for example, a positive electrode current collector, and a positive electrode material mixture layer formed on a surface of the positive electrode current collector. The positive electrode material mixture includes the positive electrode active material as an essential component, and may further include a binder, a conductive agent, and the like, as optional components.

The negative electrode includes, for example, a negative electrode current collector, and a negative electrode material mixture layer formed on a surface of the negative electrode current collector. The negative electrode material mixture includes the negative electrode active material as an essential component, and may further include a binder, a thickener and the like as optional components.

Examples of the negative electrode active material include a carbon material, silicon, a silicon compound, metal lithium and a lithium alloy. The carbon material may be, for example, graphite (e.g., natural graphite, artificial graphite), amorphous carbon, and the like.

The electrolyte may be a liquid electrolyte in which a solute, such as a lithium salt, is dissolved in a solvent. The solvent may be a non-aqueous solvent, and may be water. The electrolyte may be a solid electrolyte.

Usually, a separator is interposed between the positive electrode and the negative electrode. The separator is excellent in ion permeability and has moderate mechanical strength and electrically insulating properties. The separator may be, for example, a microporous thin film, a woven fabric, or a nonwoven fabric. The separator is preferably made of, for example, polyolefin, such as polypropylene or polyethylene.

Figure 3:
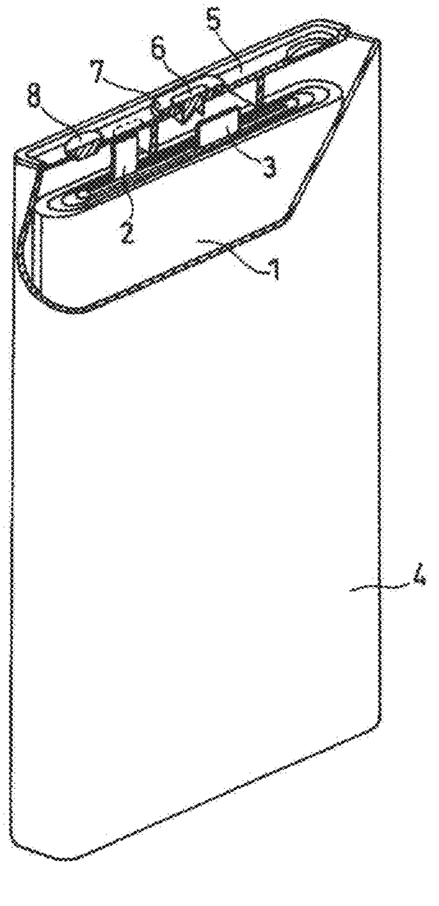
FIG. 3 A schematic partially cut-away oblique view of a prismatic secondary battery.

FIG. 3 is a partially cut-away schematic oblique view of a prismatic secondary battery. The battery includes a bottomed prismatic battery case 4, and an electrode group 1 and a liquid electrolyte (not shown) housed in the battery case 4. The electrode group 1 is of a wound type having a long negative electrode, a long positive electrode, and a separator interposed therebetween.

A negative electrode lead 3 is attached at its one end to the negative electrode current collector of the negative electrode, and connected at its other end to a negative electrode terminal 6 provided on a sealing plate 5. The negative electrode terminal 6 is electrically insulated from the sealing plate 5 by a resin gasket 7. A positive electrode lead 2 is attached at its one end to the positive electrode current collector of the positive electrode, and connected at its other end to the back side of the sealing plate 5. The Opening of the battery case 4 is sealed by laser-welding the periphery of the sealing plate 5 to the end of the opening. The electrolyte injection hole provided in the sealing plate 5 is closed with a sealing stopper 8.

The present disclosure will be specifically described below with reference to Examples and Comparative Examples. It is to be noted, however, the present disclosure is not limited to the following Examples.

Example 1

Lithium hydroxide monohydrate (average particle diameter (D50): 50 μm) was dried by heating at 150° C. for one hour, to prepare a lithium hydroxide.

$Ni_{0.85}Co_{0.12}Al_{0.03}(OH)_2$ (average particle diameter (D50) of secondary particles: approx. 15 μm) was obtained as a hydroxide A by coprecipitation. The $Ni_{0.85}Co_{0.12}Al_{0.03}(OH)_2$ was heated at 700° C. in air for two hours, and thus, $Ni_{0.85}Co_{0.12}Al_{0.03}O$ was obtained as a composite oxide B. Lithium hydroxide and $Ni_{0.85}Co_{0.12}Al_{0.03}O$ were dry-mixed such that the atomic ratio: Li/(Ni+Co+Al) of Li to the total of Ni, Co and Al became 1.05/1. A mixture was thus prepared.

The mixture was compression-molded by dry process using a briquette molding machine, to give almond-like molded bodies (maximum length L=28 min, minimum length h=13.7 mm, aspect ratio: h/L=0.49). The compression force was adjusted so that the density of the molded bodies became 1.85 $g/cm^3$.

The obtained molded bodies were packed in a ceramics rectangular parallelepiped container of 330 mm long, 330 mm wide and 220 mm deep, and sintered at 750° C. for 5 hours in an oxidizing atmosphere (oxygen concentration: 99%), to obtain sintered bodies (lithium-nickel composite oxide) A1. At this time, the ratio of space occupied by the gaps between the molded bodies in the container was 0.420. The height from the bottom of the container to the packed level LU of the molded bodies was set to 200 mm.

The obtained lithium-nickel composite oxide had a composition represented by $Li_{0.05}Ni_{0.85}Co_{0.12}Al_{0.03}O_2$. The composition of the lithium-nickel composite oxide was analyzed by ICP emission spectrometry.

Example 2

The mixture was compression-molded by dry process using another briquette molding machine, to give almond-like molded bodies (maximum length L=28 min, minimum length h=17 rum, aspect ratio: h/L=0.61). The compression force was adjusted so that the density of the molded bodies became 1.85 g/cm$^3$. A lithium-nickel composite oxide A2 was obtained in the same manner as in Example 1, except the above. The ratio of space occupied by the gaps between the molded bodies in the container was 0.443. The height from the bottom of the container to the packed level. LU of the molded bodies was set to 190 mm.

Comparative Example 1

A lithium-nickel composite oxide B1 was obtained in the same manner as in Example 1, except that the mixture was not compression-molded and sintered as it was. The height from the bottom of the container to the packed level LU of the molded bodies was set to 190 mm.

Comparative Example 2

The mixture was compression-molded by dry process using a tableting machine, to give columnar molded bodies (maximum length L=6 mm minimum length h=6 mm aspect ratio: h/L=1.0). The compression force was adjusted so that the density of the molded bodies became 1.6 g/cm$^3$. A lithium-nickel composite oxide B2 was obtained in the same manner as in Example 1, except the above. The ratio of space occupied by the gaps between the molded bodies in the container was 0.333. The height from the bottom of the container to the packed level of the molded bodies was set to 190 mm.

The crystallite size of the lithium-nickel composite oxides A1, A2, B1 and B2 obtained in Examples 1 and 2 and Comparative Examples 1 and 2 were determined by the already-described method. The values of the determined crystallite size are shown in Table

TABLE 1

| Sample | Molded body | Maximum length L (mm) | h/L ratio | LU height (mm) | Space ratio | Crystallite size (nm) |
|---|---|---|---|---|---|---|
| B1 | Powder | — | — | 190 | — | 117 |
| B2 | Pellet | 6 | 1 | 190 | 0.333 | 120 |
| A1 | Briquette | 28 | 0.49 | 200 | 0.420 | 161 |
| A2 | Briquette | 28 | 0.61 | 190 | 0.443 | 172 |

In the lithium-nickel composite oxides obtained in Examples 1 and 2, the crystallite size was significantly increased to 160 nm or more, as compared to in the lithium-nickel composite oxides obtained in Comparative Examples 1 and 2. This was presumably because in Examples 1 and 2, the circulation of gas through the gaps between the molded bodies was facilitated, and the heat conduction to the molded bodies was facilitated, allowing the sintering of the molded bodies to proceed sufficiently. In addition, unnecessary gas generated as the sintering proceeds was easily discharged outside, which also contributed to the improvement of the crystallinity of the sintered bodies.

On the other hand, in Comparative Examples 1 and 2 the circulation of gas through the gaps between the molded bodies was insufficient, and the reactivity between the lithium hydroxide and the composite oxide B was reduced, resulting in the low crystallinity of the sintered bodies.

Figure 4:
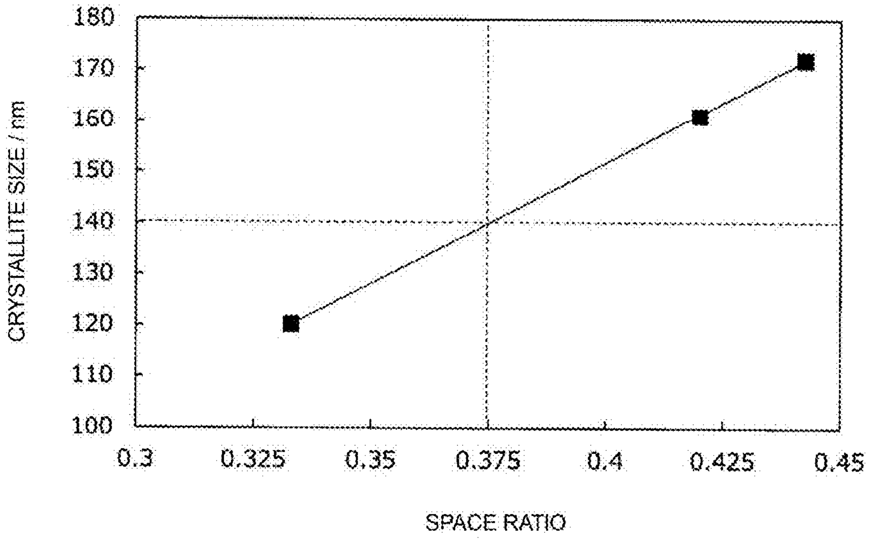
FIG. 4 A graph showing the relationship between a ratio of space and a crystallinity (crystallite size) of a lithium-nickel composite oxide.

The relationship between the space ratio and the crystallinity of the lithium-nickel composite oxide is shown in FIG. 4. FIG. 4 shows that setting the space ratio to 0.375 or more is effective in order to increase the crystallite size of the lithium-nickel composite oxide to 140 nm or more.

Figure 5:
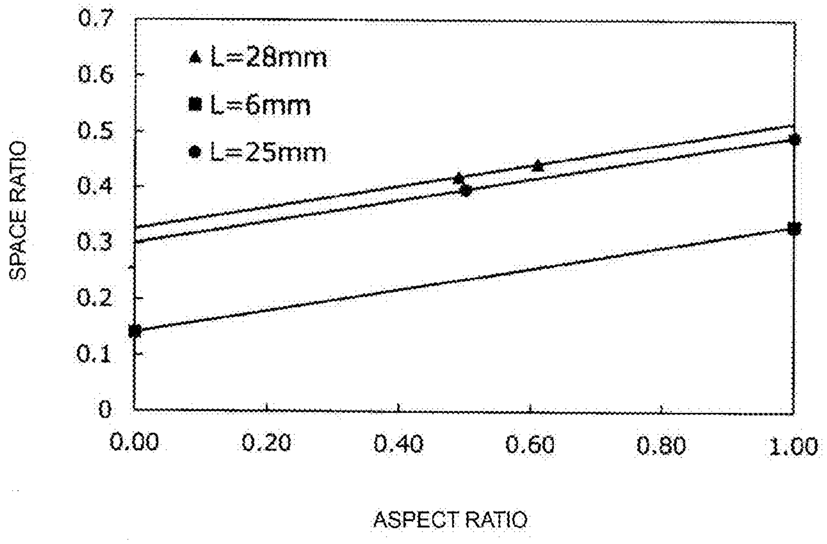
FIG. 5 A graph showing the relationship between the ratio of space and the aspect ratio.

The relationship between the space ratio and the aspect ratio is shown in FIG. 5. Here, the inclination of the straight line was calculated from two data (A1, A2) obtained when the maximum length L was 28 mm, and it was assumed that when the maximum length L was 6 mm and 25 mm too, the straight line would have the same inclination as above, Note that the data of 25 mm is a virtual data derived from the space ratio of a molded body having a spherical shape with an aspect ratio of 1.0. FIG. 5 shows that the longer the maximum length L of the molded bodies is, and the larger the aspect ratio is, the more the space ratio increases. It can be understood that even when the maximum length L is approximately 11 mm, by setting the minimum length h to be as long as 10 mm or more (i.e., by increasing the aspect ratio), the space ratio of 0.3'75 or more can be ensured.

INDUSTRIAL APPLICABILITY

The lithium-nickel composite oxide obtained by the production method according to the present disclosure is suitably used as, for example, the positive electrode active material of a secondary battery for which a high capacity and high reliability are required.

REFERENCE SIGNS LIST

1 electrode group
2 positive electrode lead
3 negative electrode lead
4 battery case
5 sealing plate
6 negative electrode terminal
7 gasket
8 sealing stopper

The invention claimed is:

1. A method for producing a lithium-nickel composite oxide, comprising:

a step of sintering a plurality of molded bodies of a mixture including a lithium-containing compound and a nickel-containing compound, in a container, to obtain sintered bodies, wherein a ratio of space occupied by gaps between the plurality of molded bodies to a volume of apparent space occupied by the plurality of molded bodies is 0.440 or greater.

2. The method for producing a lithium-nickel composite oxide according to claim 1, wherein a length L of the plurality of molded bodies is at least 25 mm.

3. The method for producing a lithium-nickel composite oxide according to claim 1, wherein the ratio of space occupied by gaps between the plurality of molded bodies to a volume of apparent space occupied by the plurality of molded bodies is 0.600 or less.

4. The method for producing a lithium-nickel composite oxide according to claim 1, wherein the container has a depth of 20 mm or more and 300 mm or less.

5. The method for producing a lithium-nickel composite oxide according to claim 4, wherein the container has a shape of 100 mm or more and 500 mm or less long, and 100 mm or more and 500 mm or less wide.

* * * * *